E. W. GOODALE,

Assignor, by mesne assignments, to THE UNION PAPER-BAG MACHINE CO.

Paper-Bag Machine.

No. 8,568. Reissued Feb. 4, 1879.

Attest,
Geo. M. Graham
John Boleschka

E. W. Goodale,
Inventor.
Assee. The Union Paper Bag Machine Co.,
by Munn & Philipp
Att'ys.

UNITED STATES PATENT OFFICE.

THE UNION PAPER BAG MACHINE CO., OF PHILADELPHIA, PENNSYLVANIA, ASSIGNEE, BY MESNE ASSIGNMENTS, OF E. W. GOODALE.

IMPROVEMENT IN PAPER-BAG MACHINES.

Specification forming part of Letters Patent No. 49,951, dated September 12, 1865; Reissue No. 8,568, dated February 4, 1879; application filed December 14, 1878.

*To all whom it may concern:*

Be it known that E. W. GOODALE, of Clinton, in the county of Worcester, State of Massachusetts, did invent a new and useful Improvement in Machines for Making Paper Bags; and the following is declared to be a full, clear, and exact description of the same, which will enable others skilled in the art to make and use the same, reference being had to the accompanying drawings, forming a part of this specification, in which drawings—

Figure 1:
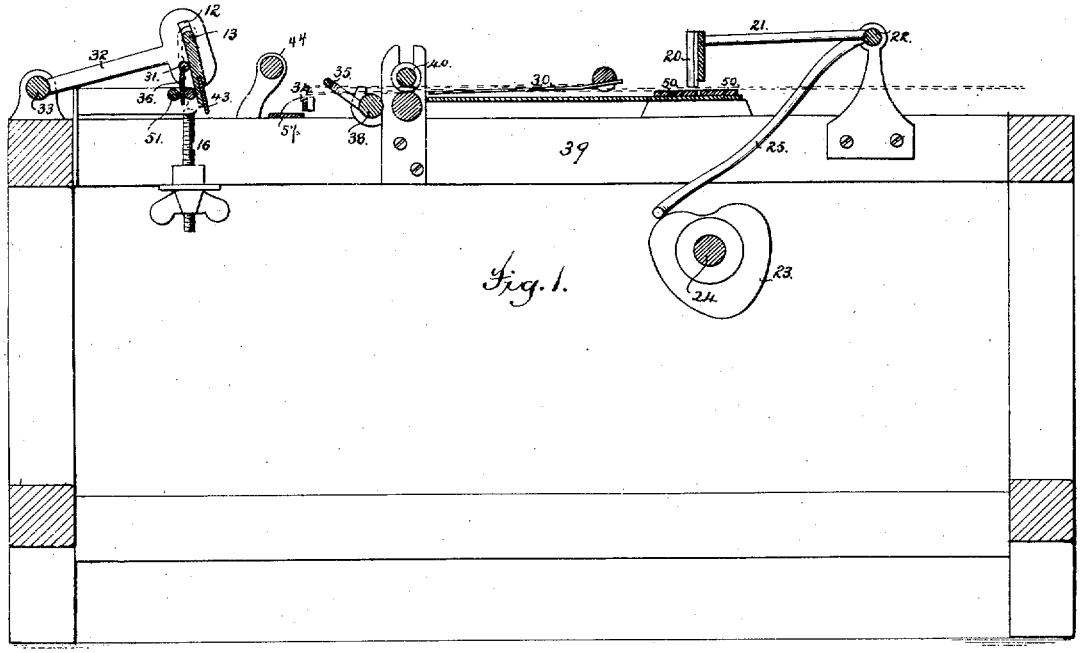
Figure 2:
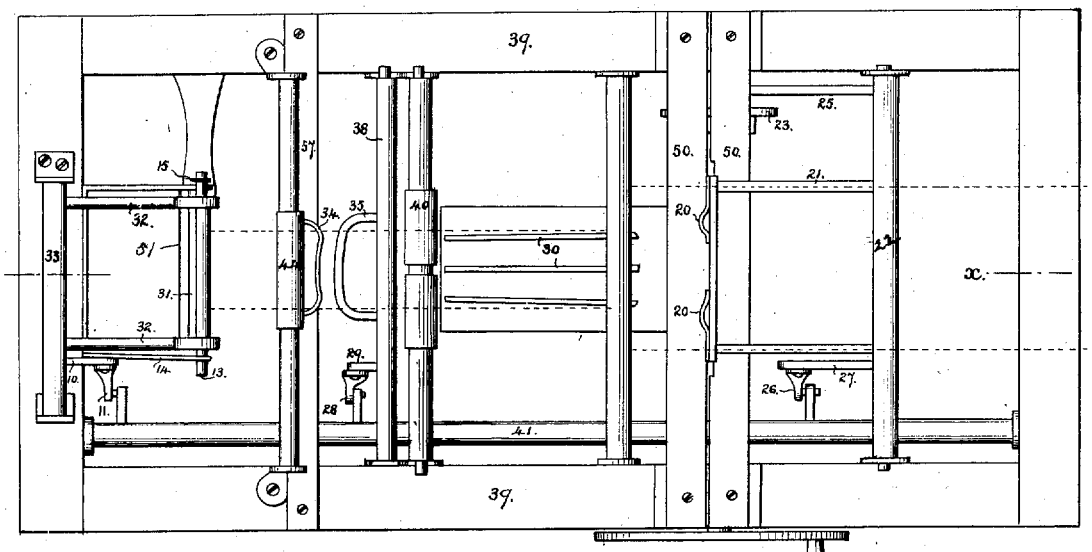
Figure 3:
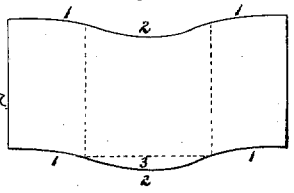
Figure 4:
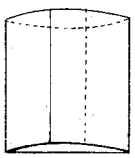

Figure 1 represents a longitudinal sectional elevation, on the line *x x* of Fig. 2, of a machine embodying this invention. Fig. 2 is a plan view of the same. Figs. 3 and 4 are diagrams illustrating the form of bag-blank and bag produced by the improvements.

This invention consists in an improved method of forming paper bags, in an improved construction of the cutting mechanism of paper-bag machines, in an improved construction of the tube-former, and in various combinations of mechanisms, all of which are fully hereinafter described.

The various working parts of the machine are properly supported in a frame, 39, made in any suitable form and of appropriate materials. The side cutters, which serve to partially sever the paper web transversely, so that the sides of the same may be folded onto the central portion thereof and have their edges united to form a bag-tube with a central seam, are secured to the ends of arms 21, which extend from a rock-shaft, 22, that is raised through a rock-arm, 25, by the action of a cam, 23, on the driving-shaft 24, and falls by its own gravity or by the action of a spring or weight. These side cutters work into a suitably-shaped cutting-slot formed between plates 50, upon which the flat or distended web is supported, and but partially sever the same transversely, whereby the extent of bag-lengths is defined, and a whole or unsevered portion of the web uniting said bag-lengths is provided, which enables the feeding mechanism to carry the same onward to the various mechanisms. Said cutters are so curved at their inner ends as to make cuts of a form adapted to be intersected by that made by the central cutter, (which completes the severance of the paper after the web is formed into a tube and detaches the forward bag-length,) the form of said cuts being such as to provide one of the plies of the tube with a projecting lap adapted to be folded or lapped onto the other ply, and thus close the end of the bag, which will be more clearly apparent from the subsequent detailed description. The cuts made by these side cutters, 20, are also of such form that the corners produced by folding the paper are so shaped that the paste shall come upon the paper where it is single, whereby it will hold better than it does when applied to the paper in the usual manner.

After having been partially severed by the side cutters 20, the web passes under the former 30, over which the sides of said web are folded in succession, so as to form a bag-tube of the requisite size.

The means by which the sides of the web may be pasted and folded upon the former 30 are shown in the Patent No. 12,945 granted to said E. W. Goodale, and it is, therefore, unnecessary to give a description of such in this specification.

The former 30 is made in three parts, the middle one of which is stationary, while the outer ones may be arranged in any known manner, so that they can be adjusted toward and from the middle part, according to the size of the bag-tube to be produced. When the side parts are thus made adjustable, one and the same former will serve for the making of bags of different sizes. The same effect might be effected by making the former in two adjustable parts.

From the former 30 the tube passes to the feeding-rollers 40, the circumference of which is equal to the length of the bag to be made, or nearly so, which rollers have an intermittent motion imparted to them in any common manner.

The center cutter, 34, serves to sever the bag-length from the tube after the same has been formed by folding the sides of the web centrally, as explained. This cutter 34, which is fixedly held in place, projects from a stationary cross-bar, 57, secured to the frame of the machine, and it acts to sever the uncut central portion of the tube by the co-operation of a vibrating arm, 35, that extends from a rock-shaft, 38, which receives an oscillating motion by suitable mechanism connecting it with the rock-shaft 22, that operates the side cutters 20, said arm thus quickly moving down onto the tube as it overlies the cutter 34, and forcing it against the cutter, thereby severing its uncut portion and completely detaching the forward bag (which is at the same time undergoing the finishing operation) from the succeeding bag-length.

The vibrating arm 35, the side cutters, 20, the folding-blade 36, that folds the projecting lap to complete the bag, and the paster 43 all move simultaneously, said mechanisms being operated from a shaft, 41, that extends throughout the entire length of the frame and has its bearings in suitable hangers or boxes. This shaft 41 connects by a rod, 26, with an arm, 27, extending from the rock-shaft 22, and by a rod, 28, with an arm, 29, extending from the rock-shaft 38, and by these means the oscillating motion of the rock-shaft 38 and the arm 35 is caused to be simultaneous with the movement of the cutters 20.

The folding blade 36, which, co-operating with suitably-revolved folding rollers 51, folds the lap projecting from the end of one of the plies of the tube onto the other ply thereof, is suspended from a rod, 31, which is rigidly connected to the outer ends of two arms, 32, extending from a rock-shaft, 33, as clearly shown. This rock-shaft 33 is connected, by a rock-arm, 10, and rod 11, with the longitudinal shaft 41, and by these means and a rod, 26, and arm 27 motion is imparted to it from the rock-shaft 22.

The outer ends of the vibrating arms 32 form guide-heads, which are provided with slots 12, forming the bearings for the ends of the rod 13, to which the paster 43 is secured. The ends of the rods 13 are allowed to play in these slots, in order that when the paster 43 strikes one of the folding-rollers it may rise in said slots and allow the folding-blade 36 to strike down between the folding-rollers to double or fold the lap projecting from one of the tube-plies onto the other ply and carry said doubled or folded end into the nip of the folding-rollers.

The ends of the rod 13 extend through the slots 12, and one end connects with an elastic cord, 14, in such manner that by the action of said cord the paster 43 is turned down to the position shown in Fig. 1, in which it is brought into contact with the end of the tube to apply paste thereto. From the other end of the rod 13 extends a strap, 15, connected to a screw-rod, 16, provided with a thumb-nut, whereby the strap can be lengthened and shortened at pleasure, and the upper end of said strap is wound around the rod 13 in such a manner that when the arms 32 rise the rod 13 turns, and the paster 43 is thrown out and brought into contact with the paste-roll 44. This paste-roll 44 is intended to derive its motion from the feeding-rollers, and it is calculated to run in the paste, so that it takes up a sufficient quantity for pasting each bag, and the paste taken up by the roll 44 is transmitted to the tube end by the action of the paster.

By lengthening or shortening the strap 15 the paster is caused to take up less or more paste, as may be desirable.

By these improvements the mechanism requisite for making paper bags is materially simplified, and one and the same machine can be easily arranged to make bags of different size.

The operation of making the bags having been incidentally explained in the course of the foregoing description, it will be readily understood that, since the feeding-rollers 40 inmittingly feed forward a bag-length, the flatly-distended paper web will be supported upon the plates 50 under the side cutters; that the web (a bag-length's distance) in advance of said cutters will have its sides folded centrally and constitute a tube enveloping the former 30, the forward end of which bag-length (defined by the transverse cuts made by the side cutters, 20) will overlie the central cutter 34, and that the free plies of the tube at the forward end of a bag-length in advance of the last named will extend to the folding-rollers 51 with the lap projecting from its lower ply lying over said rollers and under the folding-blade 36 and paster 43. Now, as the rock-shaft 22 moves the side cutters to make the transverse cuts partially severing the web for one bag-length, the vibrating arm 35 will descend and force the partially-severed tubular bag-length over the central cutter, 34, thus detaching the forward bag-length, and the paster 43 and folding-blade 36 will descend. The latter striking the said tubular bag-length at a point close to the edge of its shortest ply will double the lap projecting from its lower ply into the nip of said rollers, which will cause the bag-length to pass between them, the paster 43, which rests upon the tube end, imparting paste thereto, which causes the said lap to adhere to the upper ply and to complete the bag, which is discharged from said rollers in a finished condition. At the next movement of the feeding-rollers 40 the web is again fed forward a bag-length's distance, the unsevered portion thereof enabling the said rollers to draw the web onward, and these operations are repeated.

In Figs. 3 and 4 the form of the bag-blank and bag are shown. The lines 1 1 designate the cuts made by the side cutters, 20, and 2 the cut which is made by the central cutter, 34, after the sides of the web have been folded together to form a tube. 3 marks the lap projecting from the central part of the blank and bag-tube, which is turned up by the folding-blade to complete the bag.

It is to be understood that this invention does not include, *per se*, the means of feeding the paper to the various mechanisms, nor the means of applying paste to the web to unite the sides of the same in forming the tube;

neither does it so include the devices for turning or folding the web over the former.

What is claimed is—

1. The method of forming paper bags by feeding a web through mechanisms that operate, first, to partially sever the web transversely while distended in a single ply over a supporting-surface, whereby a direct cut through it is made that leaves a whole portion uniting contiguous bag-lengths; second, to fold or lap the sides of the partially-severed web centrally and paste the same together to constitute a tube; third, to sever the uncut portion of the tube, so as to provide a free leading end, the plies whereof may be folded one upon the other to constitute the bag-bottom; and, finally, to paste and fold said plies to complete the bag, all substantially as described.

2. The combination, with the feeding mechanism, of the side cutters, 20, constructed with curved inner ends, and the central cutter, 34, substantially as described.

3. The combination of the feeding mechanism, the former, the side cutters, the central cutter, and the bottom-closing mechanism, all substantially as described.

4. The combination, with the paster 43, of the adjustable strap 15 and pasting-roller 44, all substantially as described.

5. The combination of the feeding-rollers 40, the former 30, the side cutters, 20, the central cutter. 34, vibrating arm 35, paster 43, pasting-roller 44, folding-blade 36, and folding-rollers 51, substantially as described.

In witness whereof THE UNION PAPER BAG MACHINE COMPANY, by Edwin J. Howlett, president, has hereunto set its hand.

THE UNION PAPER BAG MACHINE COMPANY,
By EDWIN J. HOWLETT, *President.* [L. S.]

Witnesses:
H. T. MUNSON,
GEO. H. GRAHAM.